US007968476B1

(12) United States Patent
Carbajal

(10) Patent No.: US 7,968,476 B1
(45) Date of Patent: *Jun. 28, 2011

(54) FABRIC ASSEMBLY SUITABLE FOR RESISTING BALLISTIC OBJECTS AND METHOD OF MANUFACTURE

(75) Inventor: Leopoldo Alejandro Carbajal, Newark, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/694,479

(22) Filed: Jan. 27, 2010

Related U.S. Application Data

(60) Provisional application No. 61/151,283, filed on Feb. 10, 2009.

(51) Int. Cl.
*B32B 27/04* (2006.01)
(52) U.S. Cl. ............... 442/134; 2/2.5; 428/105; 442/135
(58) Field of Classification Search ...... 2/2.5; 89/36.02, 89/36.03, 36.04, 36.05; 428/102, 103, 104, 428/105, 113, 911, 902, 912; 442/134, 135, 442/64, 65, 366, 381, 389, 286, 394
See application file for complete search history.

(56) References Cited

U.S. PATENT DOCUMENTS

| 5,395,671 | A | * | 3/1995 | Coppage et al. ............ 428/102 |
| 5,465,760 | A | | 11/1995 | Mohamed et al. |
| 6,315,007 | B1 | | 11/2001 | Mohamed et al. |
| 2008/0075933 | A1 | | 3/2008 | Rovers |

OTHER PUBLICATIONS

Structural and Stress Anakysis (2nd Edition) Megson, Elsevier, 2005, pp. 150-152.*
Technical Notes NATICK/TN-91/0004, The Performance of Quilted Body Armor Systems Under Ballistic Impact by Right Circular Cylinders; by Steven Niemi and Philip Cunniff; Jul. 1991.*
Man-Made Fibers—Science and Technology, vol. 2, Section titled Fiber-Forming Aromatic Polyamides, p. 297, W. Black et al., Interscience Publishers, 1968.

* cited by examiner

*Primary Examiner* — Arti Singh-Pandey

(57) ABSTRACT

A fabric assembly particularly useful as soft body armor has two separate sections each containing a number of fabrics made from yarns having a tenacity of at least 7.3 grams per dtex and a modulus of at least 100 grams per dtex. Compressed fabrics in the first section are employed and are connected by connectors that have a force to break in tension not greater than 65 N and are spaced apart by between 6 to 51 mm. Fabrics in the second section have at most a small amount of compression and are not joined other than to prevent slippage of the fabrics relative to one another.

7 Claims, 4 Drawing Sheets

FABRIC ASSEMBLY SUITABLE FOR RESISTING BALLISTIC OBJECTS AND METHOD OF MANUFACTURE

BACKGROUND OF INVENTION

1. Field of the Invention

This invention relates to a fabric assembly particularly suitable as ballistic resistant soft body armor and method of manufacture.

2. Background

Many designs for body armor for resisting ballistic threats have been proposed and many commercialized. Designs are made to increase comfort by the wearer and/or to add extra penetration resistance without increasing areal density. Comfort is generally increased by making the body armor lighter and more flexible to allow freedom of motion by the wearer. However, reduction in apparel weight should not be achieved at the expense of a significant reduction in anti-ballistic performance.

US 2008/0075933 A1 discloses a ballistic-resistant assembly containing flexible elements of high strength fibres having connecting means on a rear part side of the assembly to interconnect adjacent elements. Such assemblies are claimed to reduce trauma (back face deformation) during a ballistic event.

Niemi and Cuniff in Technical Note Natick/TN-91/0004 with a title "The Performance of Quilted Body Armor Systems Under Ballistic Impact by Right Circular Cylinders" state that "Based on results obtained with 1.1 gram right circular cylinders, the effect of quilting resulted in little or no increase in the calculated ballistic limit values or specific energy absorption capacity of the Kevlar®, Spectra® and nylon armor systems evaluated".

There is a need for a light weight soft body armor which allows an increase in ballistic resistance without an increase in weight.

SUMMARY OF INVENTION

The present invention is directed to a fabric assembly suitable for resisting a ballistic object and method of manufacture with the fabric assembly comprising:

(a) a first section formed from a fabric comprising a plurality of connected and compacted yarn layers having warp and weft yarns made from yarn having a tenacity of at least 7.3 grams per dtex and a modulus of at least 100 grams per dtex, wherein the connected and compacted yarn layers are secured together by connector yarns woven in a thickness (Z) direction between the weft yarns of the fabric and extending in a warp direction across a plurality of weft yarns on both an upper and lower surface of the fabric so as to form discontinuous lines on the upper and lower fabric surfaces, wherein said connector yarns have a force to break in tension no greater than 65N, wherein said connector yarns are spaced in a range from 6 mm to 51 mm in the width direction of said fabric and (b) a second section comprising a plurality of fabric layers made from yarn having a tenacity of at least 7.3 grams per dtex and a modulus of at least 100 grams per dtex wherein the fabric layers of the second section are not connected by connector yarns in the manner of the first section.

DETAILED DESCRIPTION

Figure 1:
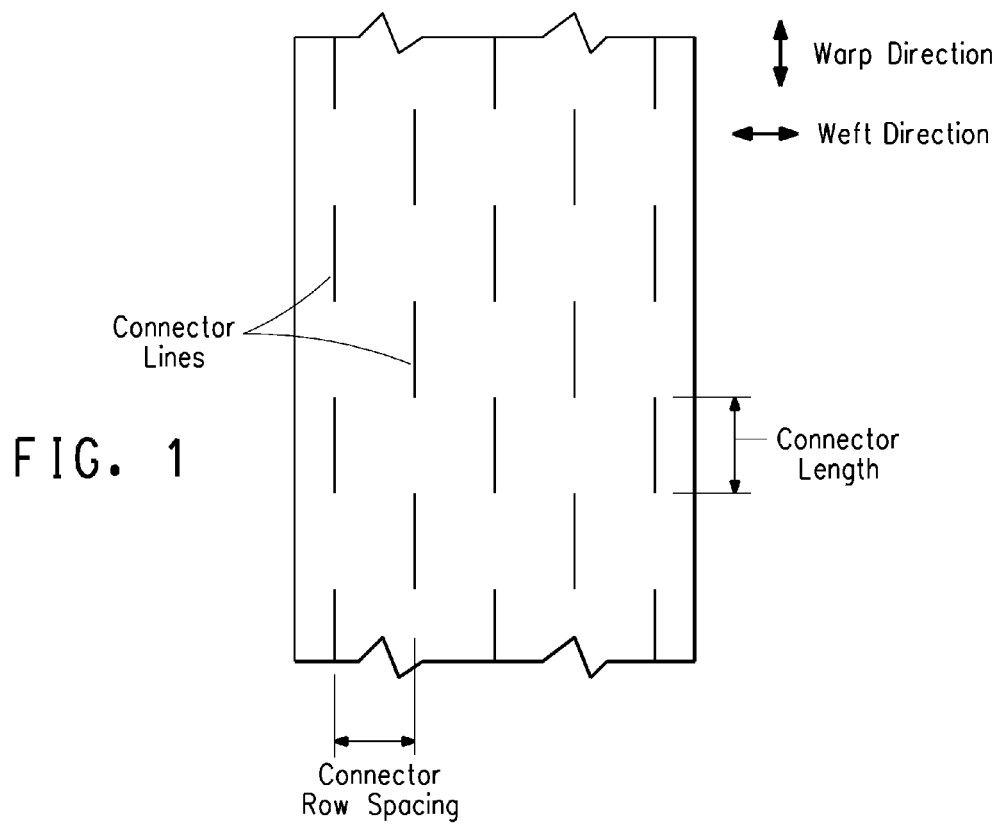
FIG. 1 is a plan view of the outer fabric layers of the first section and explains connector lines, connector length, and connector row spacing.

The fabric assembly suitable for resisting a ballistic object contains two separate and distinct sections labeled herein as a first section and a second section. Both sections contain a plurality of layers made from yarns having a tenacity of at least 7.3 grams per dtex and a modulus of at least 100 grams per dtex.

As employed herein "plurality" means at least two. However in many instances at least five and sometimes at least ten or up to 30 layers will be employed in the first and/or second sections of the fabric assembly.

Yarns in First and Second Sections of Fabric Assembly

Yarns having a tenacity of at least 7.3 grams per dtex and a modulus of at least 100 grams per dtex which are employed in the first and second sections are well known in the art. It is understood that the yarns in the first and second sections need not be identical. Suitable materials for the yarn include polyamide, polyolefin, polyazole and mixtures thereof.

When the polymer is polyamide, aramid is preferred. The term "aramid" means a polyamide wherein at least 85% of the amide (—CONH—) linkages are attached directly to two aromatic rings. Suitable aramid fibers are described in Man-Made Fibres—Science and Technology, Volume 2, Section titled Fibre-Forming Aromatic Polyamides, page 297, W. Black et al., Interscience Publishers, 1968.

A preferred aramid is a para-aramid. A preferred para-aramid is poly(p-phenylene terephthalamide) which is called PPD-T. By PPD-T is meant a homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6- naphthaloyl chloride or chloro- or dichloroterephthaloyl chloride or 3,4'-diaminodiphenylether.

Additives can be used with the aramid and it has been found that up to as much as 10 percent or more, by weight, of other polymeric material can be blended with the aramid. Copolymers can be used having as much as 10 percent or more of other diamine substituted for the diamine of the aramid or as much as 10 percent or more of other diacid chloride substituted for the diacid chloride or the aramid.

When the polymer is polyolefin, polyethylene or polypropylene is preferred. The term "polyethylene" means a predominantly linear polyethylene material of preferably more than one million molecular weight that may contain minor amounts of chain branching or comonomers not exceeding 5 modifying units per 100 main chain carbon atoms, and that may also contain admixed therewith not more than about 50 weight percent of one or more polymeric additives such as alkene-1-polymers, in particular low density polyethylene, propylene, and the like, or low molecular weight additives such as anti-oxidants, lubricants, ultra-violet screening agents, colorants and the like which are commonly incorporated. Such is commonly known as extended chain polyethylene (ECPE) or ultra high molecular weight polyethylene (UHMWPE In some preferred embodiments polyazoles are polyarenazoles such as polybenzazoles and polypyridazoles. Suitable polyazoles include homopolymers and, also, copolymers. Additives can be used with the polyazoles and up to as much as 10 percent, by weight, of other polymeric material can be blended with the polyazoles. Also copolymers can be used having as much as 10 percent or more of other monomer substituted for a monomer of the polyazoles. Suitable polyazole homopolymers and copolymers can be made by known procedures.

Preferred polybenzazoles are polybenzimidazoles, polybenzothiazoles, and polybenzoxazoles and more preferably such polymers that can form fibers having yarn tenacities of 30 gpd or greater. If the polybenzazole is a polybenzothioazole, preferably it is poly(p-phenylene benzobisthiazole). If the polybenzazole is a polybenzoxazole, preferably it is poly (p-phenylene benzobisoxazole) and more preferably poly(p-phenylene-2,6-benzobisoxazole) called PBO.

Preferred polypyridazoles are polypyridimidazoles, polypyridothiazoles, and polypyridoxazoles and more preferably such polymers that can form fibers having yarn tenacities of 30 gpd or greater. In some embodiments, the preferred polypyridazole is a polypyridobisazole. A preferred poly(pyridobisoxazole) is poly(1,4-(2,5-dihydroxy)phenylene-2,6-pyrido[2,3-d:5,6-d']bisimidazole which is called PIPD. Suitable polypyridazoles, including polypyridobisazoles, can be made by known procedures.

First Section of Fabric Assembly

The requirements of the yarn in the fabrics of the first section of the fabric assembly have been set forth above.

The warp and weft yarns having a tenacity of at least 7.3 grams per denier can be arranged orthogonally to each other. In an alternative embodiment, the warp an weft yarns have an orientation within the plane of the fabric where the crossing of the warp yarns with the weft yarns forms a pair of acute vertical angles having an angular measurement less than 90 degrees.

Further requirements of the first section include fabrics which (1) have individual layers connected to one another (2) are compacted, (3) are secured together by connectors having a mechanical strength (force to break in tension) not greater than 65 N, (4) have connector yarns that are spaced apart in rows in a range from 6 mm to 51 mm apart along the cross direction of said fabric. As employed herein "compacted" or "compaction" means the layers of the fabric have a degree of compression. i.e. a decrease in layer thickness. As employed herein "cross" means orthogonal to the direction in which the fabric is being produced.

Requirements (1), (3) and (4) are discussed in conjunction with one another.

It is necessary that the yarn layers or fabrics of the first section be physically attached to one another. The attachment of the fabric layers is by connectors having a mechanical strength not greater than 65 N. Preferably the mechanical strength will not be greater than 40 N and more preferably 35 N.

The lower limit for a mechanical strength is not critical but as a practical matter will not be less than 1 N.

The force to break in tension of the connector is the multiplier of the ultimate tensile stress of the connector material, or materials, and the cross sectional area of the connector. Thus the dimensions of the connector can be tailored to achieve the desired force to break for a particular material.

A preferred connector is a yarn or thread i.e. the separate layers of the first section are held together by yarn woven between and across the weft yarns. The thread may be a continuous filament yarn or a staple fiber. If a plied yarn is used as a connector thread, then the combined force to break of the individual threads comprising the yarn must be no greater than 65 N. A plied yarn is a yarn formed by twisting together two or more singles yarns. Suitable thread materials include aramid, cotton, nylon, polyester or elastomeric polyurethane (Lycra®). A connector yarn that shrinks when heated is an alternative means to compact fabric layers.

As set forth above the connector is required to have a force to break in tension not greater than 65 N. This strength can be determined by testing the thread prior to use.

Connector length is the length of connector yarn formed by one insertion of connector yarn across the weft yarns. The connector length may vary within a connector row and may also vary between different connector rows. Connector row spacing is the distance between adjacent parallel connector yarns. This is further detailed in FIG. 1. The connector yarn forms a discontinuous line on the outer surfaces of the first section fabric. The connector length may be of any suitable length. Preferably the length is from 2 to 16 mm and more preferably from 3 to 14 mm. Connector row spacing is from 6 to 51 mm, preferably from 6 to 25 mm and most preferably from 8 to 20 mm.

The warp and weft yarns all lie in the same plane, the XY plane. The X direction is the direction in which the fabric is being made and the Y direction is orthogonal to the X direction. The connector yarns are woven in such a way that they lie partially in a plane vertical to the XY plane, the Z direction and partially in the XY plane in the X direction. In a fabric assembly comprising a plurality of layers in the XY plane the z direction is also the thickness direction of the assembly.

The function of the connector is to enhance the momentum transfer capability of the armor without impacting the mechanical properties of the high tenacity filaments in the fabric. Another requirement is not to over-constrain the axial movement of the filaments in the fabric.

To enhance the momentum transfer, the connectors need to be able to compact the fabric layers in the region where the connector lies on the fabric surface. Compaction of the fabric layers also increases the bulk density of the fabric stack.

There are at least two, preferably at least three and more preferably at least five layers of both warp and weft yarns in the first section. The warp and weft yarns may be interlaced, i.e. woven or merely positioned on top of each other in a nonwoven arrangement. The stack of yarn layers in the XY plane has an upper and lower surface. The connector yarns are woven across some of the weft yarns on the upper and lower surfaces of the fabric.

There are many variations as to how many weft yarns the connector crosses. Preferably the connector crosses at least two and more preferably at least three weft yarns. This connector crossing pattern may vary between different connector rows. The positioning of the connector yarn on the fabric surface could also be offset between different connector rows.

Second Section of Fabric Assembly

The requirements of the yarn in the fabrics of the second section of the fabric assembly have been set forth above.

Further requirements of the second section include the fabrics are not connected by connector yarn in the manner of the first section. Also preferably the fabrics have no or only small amount of compaction. As employed herein a small amount of compaction means that the yarns in manufacture of handling are not compressed to introduce significant decrease in fiber or fabric thickness. These fabrics are known in the art as containing loose plies.

Figure 2:
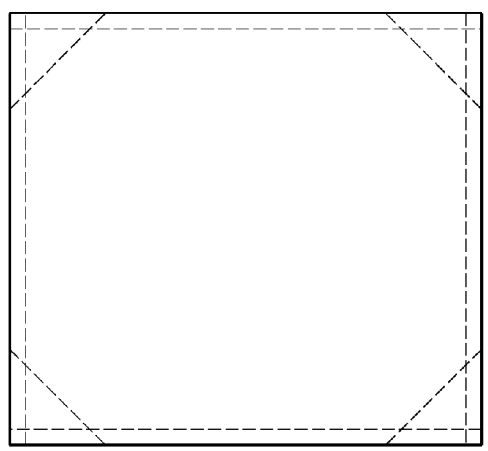
FIG. 2 is a plan view of fabric layers of the second section without connectors and held together by corner tack and edge stitching.
Figure 3A:
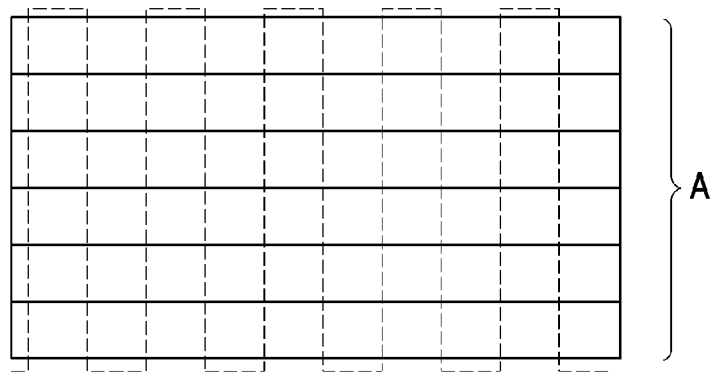
FIG. 3A is a sectional view of a plurality of layers of the first section having connectors. This is referenced as "A".
Figure 3B:
FIG. 3B is a sectional view of a plurality of fabrics layers of the second section having no connectors. This is referenced as "B".

For the second section of the fabric assembly, it is preferred that the fabric layers are not connected to one another. However it is understood that in manufacture of the overall fabric assembly it may be advisable to keep the layers aligned without slipping. Therefore as employed herein "substantially no connection" means that the amount of connection is an amount needed to prevent slipping but insufficient to force the layers to compact one another. An example of this is corner and edge stitching as depicted in FIG. 2. Accordingly the second section preferably has substantially no connection between and among (if more than two) fabrics. For requirement (2) of the second section of the fabric assembly, it is preferred the there is no compaction of the fabrics. However in normal handling and in manufacture a minimum compaction can occur.

Construction of Fabrics of the Second Section

It is understood that a wide variety of construction techniques may be used for the fabrics of the second section of the fabric assembly. Illustratively two dimensional fabrics may be woven, may be unidirectional with or without binder and may be multiaxial with layers of yarn in different orientation. Three dimensional fabrics may also be utilized provided that the yarns used in the thickness (Z) direction all have a force to break of greater than 65 N. Each of the fabrics are well known in the art. Examples of these three dimensional fabrics are to be found in U.S. Pat. Nos. 5,465,760 and 6,315,007. It is further understood that different combinations of fabrics both in construction and composition can be employed in the first section and in the second section of the fabric assembly.

Body Armor Article

The body armor article comprises at least two fabric layer sub-assemblies, one sub-assembly comprising fabric layers having connectors, the first section and the other comprising fabric layers without connectors, the second section. Each sub-assembly can have from two to thirty fabric layers stacked together. The fabric layers in the different sub-assemblies can be the same or different. A final assembly comprises at least one type of each sub-assembly. The final assembly is then fitted into a vest pack or body armor article.

The total number of fabric layers from all of the sub-assemblies comprising the final assembly, when stacked together, should preferably have an areal density no greater than 5.0 kg/m$^2$ and preferably no greater than 4.68 kg/m$^2$.

Depending on the ballistic vest design, the number of fabric layers requiring connectors will vary. The location of layers having connectors and those not having connectors can vary within the assembly e.g. see FIGS. 4, 4A, 5, 6A and 6B. In these figures a fabric layer identified with an "A" has connectors and those identified by a "B" has no connectors. Combinations of sub-assemblies other than those described in the drawings are also useful.

Figures 4, 4A:
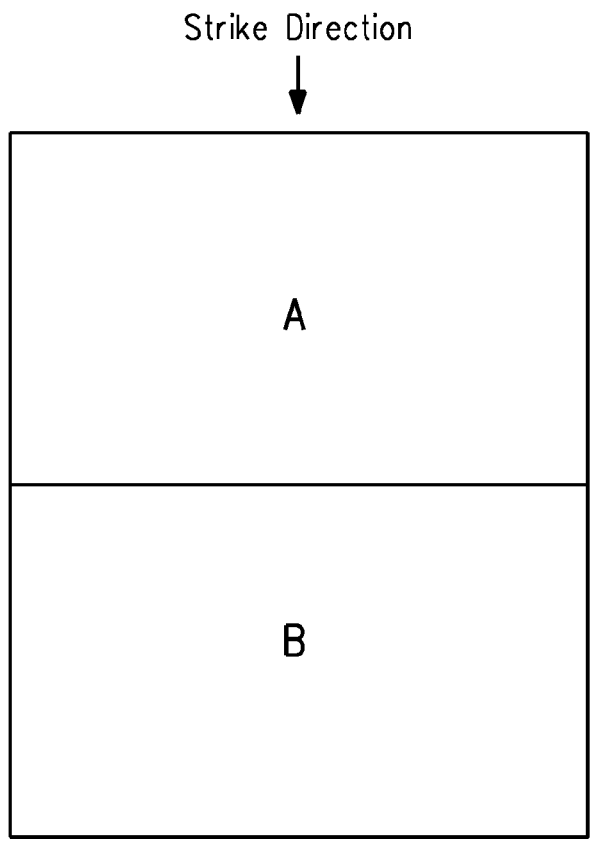
FIG. 4 is a sectional view of a vest stack having a first section per A of FIG. 3A at the strike face and a plurality of fabric layers of the second section per B of FIG. 3B at the back face.
FIG. 4A is a sectional view of a vest stack assembled from a number of sub-assemblies of fabric layers A at the strike face and a number of sub-assemblies of fabric layers B at the back face.

In a first embodiment as shown in FIG. 4, a sub-assembly "A" comprising fabric layers having connectors is facing the strike direction while a sub-assembly "B" comprising fabric layers without connectors is facing the non-strike direction.

In a second embodiment, a number of sub-assemblies each comprising fabric layers having connectors is facing the strike direction while a number of sub-assemblies each comprising layers without connectors is facing the non-strike direction. This is exemplified by FIG. 4A which shows three sub-assemblies of fabric layers with connectors, A1, A2 and A3, facing the projectile and three sub-assemblies of fabric layers without connectors, B1, B2 and B3, facing the non-strike direction.

Figure 5:
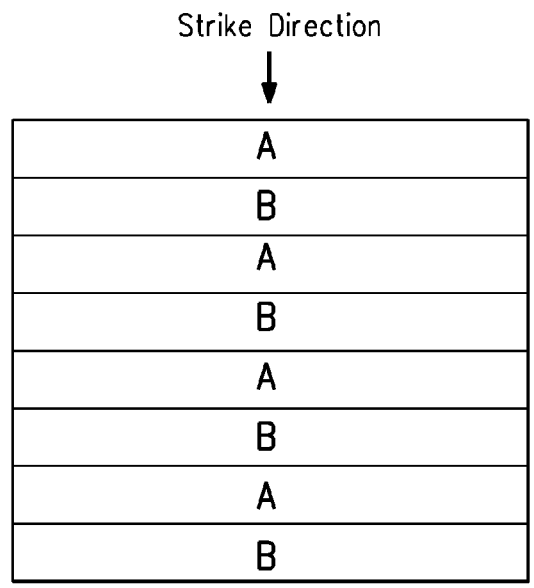
FIG. 5 is a sectional view of a vest stack having a repeat sequence of A and B.
Figure 6A:
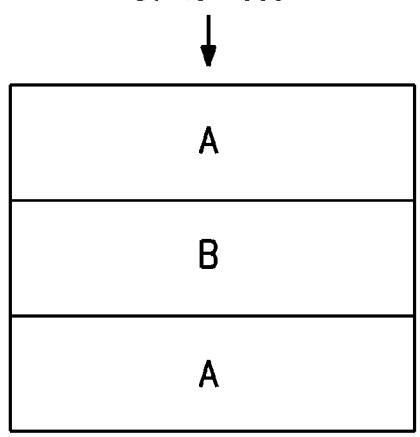
FIG. 6A is a sectional view of a vest stack having first sections per A of FIG. 3A as a strike face and a back face sandwiching a core having a second section per B of FIG. 3B.
Figure 6B:
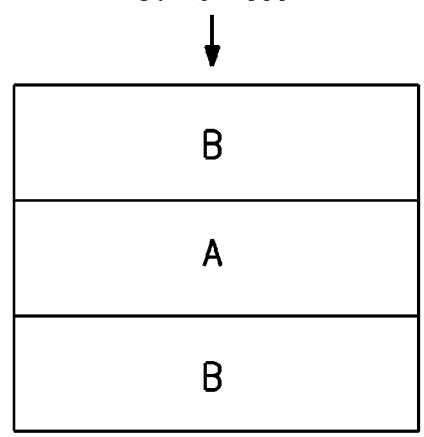
FIG. 6B is a sectional view of a vest stack having second sections per B of FIG. 3B as a strike face and back face sandwiching a core having a first section per A of FIG. 3A.

A third embodiment, as in FIG. 5, covers an arrangement of alternating sub-assemblies of fabric layers having connectors "A" and fabric layers without connectors "B".

In a fourth embodiment, two sub-assemblies each comprising fabric layers having connectors form the two outer layers of the final assembly with a sub-assembly comprising fabric layers without connectors forming the core of the assembly. This is demonstrated in FIG. 6A.

In a fifth embodiment, two sub-assemblies each comprising fabric layers without connectors form the two outer layers of the final assembly with a sub-assembly comprising fabric layers having connectors forming the core of the assembly. This is demonstrated in FIG. 6B.

The fabric layers of the sections without connectors must be held together to maintain a certain level of coherence. These layers can, for example, be attached by stitches or adhesive or melt bonding at the edges and/or across the corners of the fabric. These stitches in the fabric layers do not compact the layers in the same way as do the connectors and have no influence on anti-ballistic performance. Any suitable thread may be used for sewing at the edges and corners. Aramid thread is particularly suitable for edge and corner stitching. Edge or corner stitching is an optional process for the fabric layers having connectors, the benefit being that it may aid the final assembly process.

Preferably, the ballistic resistant fabric final assembly has a V50 of at least 465 m/sec when tested against a 9 mm projectile and/or V50 of at least 579 m/sec when tested against a 17 grain projectile and the fabric layers, when stacked together, have a stack areal density not exceeding 4.68 kg/m$^2$ (0.95 lb/ft$^2$). V50 is a statistical measure that identifies the average velocity at which a bullet or a fragment penetrates the armor equipment in 50% of the shots, versus non penetration of the other 50%. The parameter measured is V50 at zero degrees where the degree angle refers to the obliquity of the projectile to the target.

Method of Assembly

A process for making a fabric assembly for a soft body armor article comprises the steps of (1) forming at least one first section comprising a compacted fabric said fabric further comprising at least one layer of warp reinforcement yarns having a tenacity of at least 7.3 grams per dtex and a modulus of at least 100 grams per dtex, the yarns being arranged in parallel with the longitudinal direction of said fabric and at least one layer of weft reinforcement yarns having a tenacity of at least 7.3 grams per dtex and a modulus of at least 100 grams per dtex arranged in the same plane as the warp reinforcement yarns wherein the warp and weft yarns are connected, compacted and secured together by connector yarns woven in a thicknesswise (z) direction between the weft yarns of the fabric and extending in the warp direction across a plurality of weft yarns on both the upper and lower surfaces of the fabric so as to form discontinuous lines on the fabric surfaces, said connector yarns having a force to break in tension no greater than 65 N, wherein said connector yarns are spaced in a range from 6 mm to 51 mm apart along the cross direction of said fabric, (2) forming at least one second section comprising fabric layers having no connectors (3) stitching the fabric layers of the second section at least along edges or across corners and (4) combining the sub-assemblies of first and second sections in the desired sequence such that the total weight of all fabric layers is less than 5.0 kg/m² and more preferably less than 4.68 kg/m² and (4) placing the final fabric assembly in a pouch or vest pack.

Test Methods

Temperature: All temperatures to be measured are in degrees Celsius (° C.).

Linear Density: The linear density of a yarn or fiber is determined by weighing a known length of the yarn or fiber based on the procedures described in ASTM D1907-97 and D885-98. Decitex or "dtex" is defined as the weight, in grams, of 10,000 meters of the yarn or fiber. Denier (d) is 9/10 times the decitex (dtex).

Tensile Properties: The fibers to be tested are conditioned and then tensile tested based on the procedures described in ASTM D885-98. Tenacity (breaking tenacity), modulus of elasticity, force to break and elongation to break are determined by breaking test fibers on an Instron universal test machine.

Areal Density: The areal density of the fabric layer is determined by measuring the weight of each single layer of selected size, e.g., 10 cm×10 cm. The areal density of a composite structure is determined by the sum of the areal densities of the individual layers.

Ballistic Penetration Performance: Ballistic tests of the multi-layer panels are conducted in accordance with standard procedures such as those described in procurement document FQ/PD 07-05B (Body Armor, Multiple Threat/Interceptor Improved Outer Tactical Vest) and MIL STD-662F (V50 Ballistic Test for Armor). Preferably four targets are tested for most examples and between six to nine shots, at zero degree obliquity, fired at each dry target. The reported V50 values are average values for the number of shots fired for each example.

What is claimed is:

1. A fabric assembly suitable for resisting a ballistic object comprising:

(a) a first section formed from a fabric comprising a plurality of connected and compacted yarn layers having warp and weft yarns made from yarn having a tenacity of at least 7.3 grams per dtex and a modulus of at least 100 grams per dtex, wherein the connected and compacted yarn layers are secured together by connector yarns woven in a thickness (Z) direction between the weft yarns of the fabric and extending in a warp direction across a plurality of weft yarns on both an upper and lower surface of the fabric so as to form discontinuous lines on the upper and lower fabric surfaces, wherein said connector yarns have a force to break in tension no greater than 65 N, wherein said connector yarns are spaced in a range from 6 mm to 51 mm in the cross direction of said fabric and (b) a second section comprising a plurality of fabric layers made from yarn having a tenacity of at least 7.3 grams per dtex and a modulus of at least 100 grams per dtex wherein the fabric layers of the second section are not connected by connector yarns in the manner of the first section.

2. The fabric assembly of claim 1 wherein the fabrics of the second section are connected only with sufficient mechanical strength to prevent slippage of the layers relative to one another.

3. The fabric assembly of claim 1 wherein the total number of fabric layers of the first and second sections, when stacked together, have an areal density less than 5.0 kg/m².

4. A connector of claim 1 in the form of a thread comprising filaments of cotton, polyester, p-aramid, elastomeric polyurethane and mixtures thereof.

5. The fabric of claim 1, wherein the continuous yarns are made of filaments made from a polymer selected from the group consisting of polyamides, polyolefins, polyazoles, and mixtures thereof.

6. A process for making a fabric assembly for a body armor article comprising the steps of:

(a) forming at least one first section comprising a fabric said fabric further comprising a plurality of connected and compacted warp and weft yarns made from yarn having a tenacity of at least 7.3 grams per dtex and a modulus of at least 100 grams per dtex, wherein the connected and compacted yarn layers are secured together by connector yarns woven in a thickness (Z) direction between the weft yarns of the fabric and extending in the warp direction across a plurality of weft yarns on both upper and lower surfaces of the fabric so as to form discontinuous lines on the fabric surfaces, said connector yarns having a force to break in tension no greater than 65 N, wherein said connector yarns are spaced in a range 6 mm to 51 mm apart along the cross direction of said fabric, and (b) forming at least one second section comprising a plurality of fabric layers made from yarn having a tenacity of at least 7.3 grams per dtex and a modulus of at least 100 grams per dtex wherein the fabric layers are not connected by connector yarns in the manner of the first section, (c) securing said plurality of fabric layers of the second section at the corners and around the edges so as to provide a cohesive bundle and (e) combining at least one first section with at least one second section into a fabric assembly.

7. The fabric assembly of claim 6 wherein the total number of fabric layers of the first and second sections, when stacked together, have an areal density less than 5.0 kg/m².

* * * * *